Nov. 29, 1955    H. W. HEIN    2,725,245
AUTOMATIC MILK COCK
Filed Aug. 21, 1953
FIG. 1
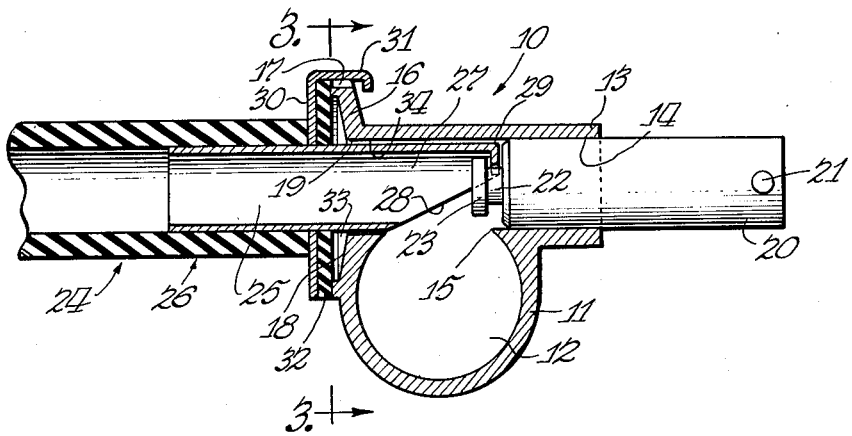
FIG. 2
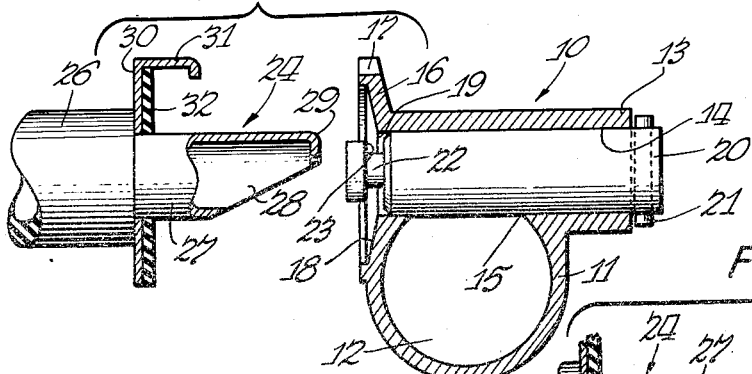
FIG. 3
FIG. 4
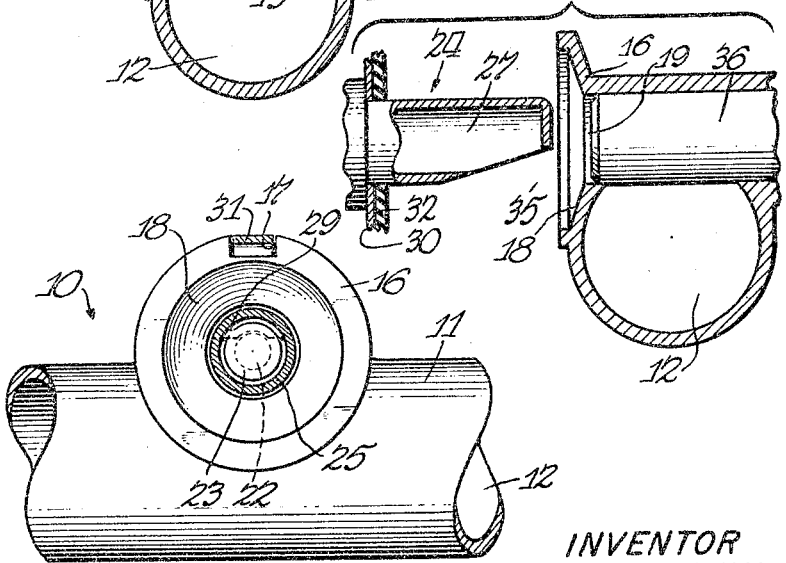
INVENTOR
HAROLD W. HEIN
Paul O. Pippel
ATTORNEY

United States Patent Office 2,725,245
Patented Nov. 29, 1955

2,725,245

AUTOMATIC MILK COCK

Harold W. Hein, Chicago, Ill., assignor to International Harvester Company, a corporation of New Jersey Application August 21, 1953, Serial No. 375,741

1 Claim. (Cl. 284—17)

This invention relates to a coupling device. More specifically, the invention relates to a stall cock used in connection with the vacuum conduit of a milking machine installation.

Stall cocks or coupling devices of the type with which this invention is concerned are generally connected to the vacuum conduit of a milking machine installation. Such an installation usually comprises a vacuum pump at one end of the vacuum conduit and a vacuum regulator which is positioned at the other end. Milking machines generally consist of a pulsating unit which is connected to a conventional teat cup cluster adapted to be attached to the udder of the animal to be milked. The pulsator is actuated by means of vacuum and a flexible vacuum hose, which is attached to the pulsator, is adapted to be connected to the stall cocks to provide the necessary vacuum. In large dairy installations it is desirable to provide more than one stall cock in the vacuum conduit. Thus, the operator can quickly couple and uncouple his milking machine with respect to a plurality of stall cocks so that the milking machine may be quickly moved from one stanchion to another. In order to secure maximum efficiency in milking, it is desirable to provide a stall cock which permits ease of connection and which will automatically be closed when the flexible hose is removed from the connection. It is a prime object, therefore, to provide an improved stall cock coupling having improved provisions whereby the stall cock will automatically close upon withdrawal of the milk hose connection.

A still further object is to provide an improved stall cock or coupling device, the device including a plug-in connection which is adapted to be connected to the milk hose of a milking machine, the plug-in connection being adapted to open the milk hose to the vacuum conduit when the connection is plugged into the stall cock, the plug-in connection also including means whereby the coupling is closed when the plug-in connection is withdrawn from plug-in relation with respect to said coupling.

A still further object is to provide a coupling device for a vacuum line, the coupling device including a movable valve which is displaced upon the insertion of a plug-in connection into the coupling to provide for communication between the plug-in connection and the coupling, the valve being movable to a closed position during the withdrawal of the plug-in connection from said coupling.

Still another object is to provide an improved stall cock coupling including a plug-in conduit connection which during the plug-in relation, with respect to the coupling, provides for communication between the connection and the vacuum line to which the coupling is attached, the plug-in connection also including means engageable with the stall cock for securing the plug-in connection in an assembled position with the stall cock, the said means comprising a sealing element on the plug-in connection which is engageable with a portion on the stall cock to provide a vacuum chamber, which because of the differential in pressure between the chamber and the atmosphere, causes the plug-in connection to be firmly maintained in the desired position.

These and further objects will become more readily apparent from a reading of the specification when examined in connection with the accompanying sheet of drawing.

In the drawing:

Figure 1 is a cross-sectional view, in elevation, of an improved stall cock assembly including a plug-in conduit connection;

Figure 2 is a view similar to Figure 1 showing the position of a plug-in connection either before or after its plug-in relation with respect to the stall cock;

Figure 3 is a cross-sectional view taken along the line 3—3 of Figure 1; and

Figure 4 is a cross-sectional view, in elevation, of a modified form of stall cock assembly.

Referring now to Figures 1 through 3, a coupling or stall cock assembly is generally designated by the reference character 10. The coupling 10 comprises a tubular body 11 which may in turn be connected, by suitable pipe couplings, to the vacuum line (not shown) of a milking machine. The tubular body 11 comprises a vacuum chamber 12 which is provided at its upper end with a boss or projection 13. The boss or projection 13 includes a bore 14 extending transversely with respect to the tubular body 11. The bore is provided, intermediate its ends, with an open portion 15 in communication with the chamber 12.

One end of the boss 13 is provided with a dish-shaped member 16, best shown in Figure 3. The dish-shaped member 16 is provided at its upper end with a slot 17 adjacent an annular cavity or funnel-shaped wall 18. The wall 18 is provided with a central opening 19, forming one end of the bore 14.

A valve 20 is reciprocally positioned within the bore 14. A stop pin 21 projects outwardly from one end of the valve to limit movement of the valve 20 in one direction, as indicated in Figure 2. The valve 20 at its other end is provided with a small plug or projection 22 which is integral with an enlarged knob providing a hook-receiving portion 23.

A plug-in conduit connection is generally indicated at 24. The plug-in connection 24 comprises a tubular member 25 to which a flexible conduit 26 is connected. The flexible conduit 26 may be suitably connected to a milking machine (not shown). The tubular member 25 includes a tubular extension 27 projecting outwardly from the conduit 26. The tubular extension is cut diagonally to provide an opening 28. A downwardly projecting integral lip 29 is provided at one end of the tubular extension 27. A disk 30 is suitably connected to and encircles the tubular extension 27. The disk 30 is provided at its upper end with a laterally extending guide element 31 which is adapted to register within the slot 17, as best shown in Figure 3. The disk 30 also includes a flexible sealing pad 32, the said pad 32, as indicated in Figure 1, forming with the dish-shaped member 16 a second vacuum chamber 33.

In the operation of the preferred embodiment, shown in Figures 1 through 3, the operator inserts the downwardly projecting lip or hook 29 in the hook-receiving portion 23. He then plugs in the tubular extension 27, moving the valve 20 outwardly whereupon, as indicated in Figure 1, the chamber 12 and the tubular member 25 are in communication. The lip 29 continues to engage the hook-receiving portion 23 so that the valve 20 is limited in its outward movement with respect to the bore 14.

The flexible sealing pad 32 now engages the dish-shaped member 16 in sealing relation whereby the second vacuum chamber 33 is formed. The tubular extension 27 has a smaller outer diameter than the inner diameter of the bore 14 so that a substantially loose fit is provided. This loose fit, as indicated at 34, provides a channel or passage through which the chambers 33 and 12 are in communication. The pressure differential between the chamber 33 and the outside atmosphere is sufficient to maintain the plug-in connection 24 in secure assembled relation with respect to the stall cock assembly. Thus, the vacuum chamber 12 is assured against leakage and a close fitting coupling is provided. To disconnect the assembly, the operator merely overcomes the vacuum pressure in the chamber 33 by firmly pulling on the plug-in connection 24. As indicated in Figure 2, upon removal of the plug-in connection 24, the valve 20 is moved into position wherein the open portion of the bore 15 is blocked relative to the chamber 12. Thus again, the stall cock is closed and leakage of vacuum is prevented.

In the modification shown in Figure 4, like reference characters, where the parts are similar, have been applied. However, in this construction a valve 36 is sufficiently magnetized and is engaged by a lip 35 provided on the extension 27 so that upon removal of the plug-in connection 24, the valve 36 is moved to the closed position. It is, of course, obvious that either the tubular extension 27 or the valve 36, or both, may be suitably magnetized to effectuate the desired function. By utilizing this type of construction, the hook-type relation between the extension and the valve is eliminated.

It can thus be seen that an improved stall cock assembly has been provided and that the objects of the invention have been fully achieved. It must be understood that additional changes or modifications may be made which do not depart from the spirit of the invention as disclosed or from the scope thereof as defined in the appended claim.

What is claimed is:

A coupling device for a conduit adapted to be connected to a source of vacuum comprising a tubular body having a first chamber for communication with a conduit, a boss on said body, said boss having an axial bore extended transversely to said tubular body, said bore having an intermediate portion opening into said first chamber, a dish-shaped member on said boss having a second chamber in communication with said bore, a valve slidably disposed in said bore moveable from a position obstructing said intermediate portion of the bore to a position where said intermediate portion is unobstructed, a connector comprising a tube, a backing element connected to and encircling said tube, a resilient sealing element adjacent to said backing element, said tube including a tubular extension having a radial opening therein, said extension releasably fitted into said bore with the end thereof abutted against said valve to hold said valve in a position where the intermediate portion of said bore is unobstructed; said sealing element engaging the dish-shaped member whereby the pressure differential when connected to a vacuum holds the body and connector in coupling relation, and a magnetic means on said extension engaging said valve member to move said valve member to a position obstructing said intermediate portion of the bore when the body and connector are uncoupled.

References Cited in the file of this patent
UNITED STATES PATENTS

| | | |
|---|---|---|
| 797,480 | White | Aug. 15, 1905 |
| 2,456,276 | Harstick | Dec. 14, 1948 |
| 2,468,618 | Dinesen | Apr. 26, 1949 |
| 2,638,914 | Flaith | May 19, 1953 |
| 2,647,767 | Anderson | Aug. 4, 1953 |
| 2,667,895 | Pool et al. | Feb. 2, 1954 |

FOREIGN PATENTS

| | | |
|---|---|---|
| 231,061 | Great Britain | Mar. 26, 1925 |